S. G. Coleman,
Harness Hook,
Nº 28,126. Patented May 1, 1860.
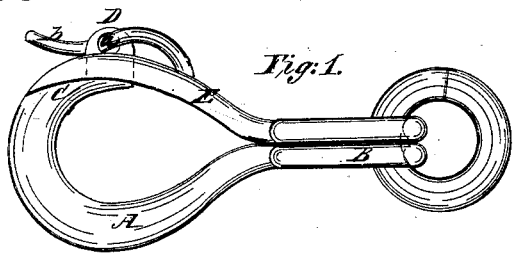
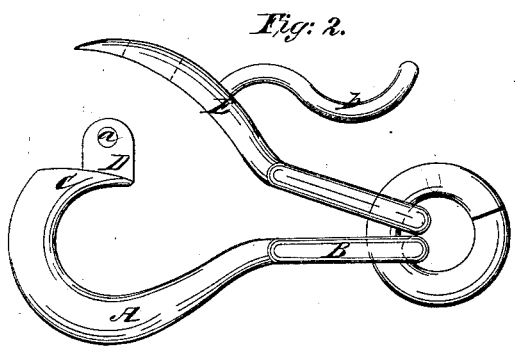
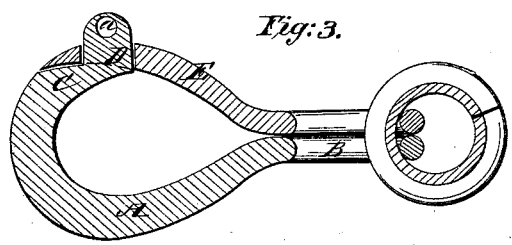
Witnesses:
Inventor:

UNITED STATES PATENT OFFICE.

STEPHEN G. COLEMAN, OF PROVIDENCE, RHODE ISLAND, ASSIGNOR TO HIMSELF AND WILLIAM COLEMAN, OF SAME PLACE.

MOUSING-HOOK.

Specification of Letters Patent No. 28,126, dated May 1, 1860.

*To all whom it may concern:*

Be it known that I, STEPHEN G. COLEMAN, of the city and county of Providence and State of Rhode Island, have invented an Improved Hook, Which is Particularly Useful for Naval and Maritime Purposes; and I do hereby declare that the same is fully described and represented in the following specification and the accompanying drawings, of which—

Figure 1, denotes a side view of the hook with its two parts locked together. Fig. 2, a side view showing the two parts as unlocked or opened. Fig. 3, represents a longitudinal and vertical section of the hook as closed.

A good and substantial hook, one which could be readily moused and unmoused, is a desideratum which has long existed in the naval and maritime service, and various methods for accomplishing this object or supplying this want have been resorted to. One method is to bind around the shank and nose of the common hook after it has been connected with a thimble or other article, a rope or cord so as to prevent the hook from becoming disengaged, but this while it secures the object is very inconvenient and requires too much time to effect it. Another method is to make the hook in two parts (in fact making it a double hook) each of which was a counterpart of the other, but this is also attended with serious disadvantages, as the point of each part has to be passed separately through the thimble or gromet or whatever article it was to be attached to. Another method was to attach a spring to the shank of the hook, and so formed as to have its front edge or surface rest against the inner surface of the point, and extend a short distance beyond the same, but such spring soon becomes ineffectual owing to oxidation of the metal.

The object of my invention has been to produce a hook which should be free from the above objections, and which at the same time should be efficient and easily operated.

The nature of my invention consists in constructing the hook in two parts in manner as hereinafter set forth, and so locking or connecting such parts together, as not only to insure great strength and efficiency to the hook, but great facility in connecting it to, or disconnecting it from any article or object.

In the drawings, A, denotes the body of the hook, the same having the general form or C shape of those in ordinary use. The shank is formed with an eye, B, as shown in the drawings, and furthermore the point, C, of the hook is flattened on its top surface, its front portion or edge being reduced or formed tapering, as shown in the drawings. From the nose or front part of the hook, and at a right angle thereto, a stud or projection, D, extends upward, and has a hole, $a$, formed through it. The said projection is intended to pass through the secondary or hasp part, E, of the hook, as seen in Fig. 1. Moreover the said secondary or hasp portion has the shank formed like, or as a counterpart to the main shank, and from its shank, is of a crescent shape, the same being scarfed on its front inner edge, to conform to the bevel or scarf on the nose of the body of the hook, and furthermore, the said hasp portion has a rectangular slot formed through it, for reception of the stud, D, which when passed through the said slot, the two parts can be secured together, by passing one end of a strap or band, $b$, through the hole, $a$, the said strap or band being at its other end attached to the hasp portion in any proper manner. The shanks are secured together, by means of a thimble of such size, as to enable the two parts of the hook to be readily opened asunder, or closed together, as circumstances may require.

A hook constructed in the above described improved manner, has several advantages. In the first place, it possesses double the strength of one constructed in the ordinary manner. In the second place its peculiar construction renders it very durable and little liable to get out of order. In the third place, it is very easily operated as the hasp portion can be turned entirely back out of the way, when the nose of the main portion is being passed through a thimble or gromet; when so passed through, it can readily be turned back upon the main portion and locked thereto; and besides the method of locking or confining the parts together is very simple and efficient.

Having thus described my invention I claim and desire to secure by Letters Patent—

As an improved article of manufacture: a hook A provided with a perforated stud D and a movable strengthening hasp E, as herein shown and described.

STEPHEN G. COLEMAN.

Witnesses:
F. P. HALE, Jr.,
ARTHUR NEILL.